United States Patent
Smith et al.

(10) Patent No.: US 9,465,888 B1
(45) Date of Patent: *Oct. 11, 2016

(54) ENHANCED SEARCH WITH USER SUGGESTED SEARCH INFORMATION

(71) Applicant: Amazon Technologies, Inc., Reno, NV (US)

(72) Inventors: Graeme Smith, Dalkeith (GB); Matthew J. Round, Westfield (GB); Andrew Birkett, Edinburgh (GB); Elinor Trotter, Edinburgh (GB); Michael Davidson, Livingston (GB); Gregory Huczynski, Edinburgh (GB); Jason King, Linlithgow (GB); Haakon Sorensen, Leavenworth, WA (US); Jason Kilar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,595

(22) Filed: Jan. 8, 2014

Related U.S. Application Data

(63) Continuation of application No. 11/961,892, filed on Dec. 20, 2007, now Pat. No. 8,799,250.

(60) Provisional application No. 60/908,157, filed on Mar. 26, 2007.

(51) Int. Cl.
 *G06F 17/30* (2006.01)

(52) U.S. Cl.
 CPC ................... *G06F 17/3097* (2013.01)

(58) Field of Classification Search
 CPC ............... G06F 17/30864; G06F 17/30867; G06F 17/30011; G06F 17/3064; G06F 17/30648; G06F 17/3097; G06Q 30/02
 USPC ........................................... 707/705
 See application file for complete search history.

(56) References Cited

U.S. PATENT DOCUMENTS

| | | | |
|---|---|---|---|
| 6,785,671 B1 * | 8/2004 | Bailey et al. | 705/26.81 |
| 6,963,848 B1 * | 11/2005 | Brinkerhoff | 705/7.32 |
| 6,963,867 B2 * | 11/2005 | Ford et al. | 707/752 |
| 7,594,176 B1 | 9/2009 | English | |
| 7,809,758 B2 | 10/2010 | Thurnhofer et al. | |
| 7,870,038 B1 | 1/2011 | Hammond et al. | |
| 8,577,755 B2 * | 11/2013 | Wiesinger | 705/27.1 |
| 8,626,823 B2 * | 1/2014 | Kumar | 709/203 |
| 8,719,283 B2 * | 5/2014 | Koski | 707/750 |

(Continued)

*Primary Examiner* — James Trujillo
*Assistant Examiner* — Jessica N Le
(74) *Attorney, Agent, or Firm* — Knobbe, Martens, Olson & Bear, LLP

(57) ABSTRACT

A method and system are disclosed for allowing a user to suggest information about content that can be utilized in processing subsequent searches. The suggested information may be different from a fixed set of information about an item, such as keywords, attributes or characteristics of an item, generally provided by a manufacturer or seller of the item. Users can submit to a service the information that they feel is relevant to the item, such as a brief explanation of relevance and a detailed explanation that would help other users to make a decision about the item. The submitted information may be associated with the item information and stored in a data store and utilized as additional attributes of the item for a search. In addition, when a user requests detail information about an item, the user-submitted information may be displayed to the user.

20 Claims, 15 Drawing Sheets

(56) References Cited

U.S. PATENT DOCUMENTS

| | | |
|---|---|---|
| 2002/0010625 A1* | 1/2002 | Smith et al. .................... 705/14 |
| 2002/0138481 A1 | 9/2002 | Aggarwal et al. |
| 2003/0088554 A1 | 5/2003 | Ryan et al. |
| 2003/0105682 A1 | 6/2003 | Dicker et al. |
| 2004/0083135 A1 | 4/2004 | Chau |
| 2005/0021611 A1* | 1/2005 | Knapp et al. ................. 709/203 |
| 2005/0021646 A1* | 1/2005 | Kumar .......................... 709/206 |
| 2005/0033801 A1 | 2/2005 | Czuchry, Jr. et al. |
| 2005/0177582 A1* | 8/2005 | Baird-Smith et al. ........ 707/100 |
| 2005/0222987 A1* | 10/2005 | Vadon ............................... 707/3 |
| 2005/0234891 A1 | 10/2005 | Walther et al. |
| 2007/0043583 A1* | 2/2007 | Davulcu et al. .................. 705/1 |
| 2007/0061334 A1 | 3/2007 | Ramer et al. |
| 2007/0078851 A1 | 4/2007 | Grell et al. |
| 2007/0106627 A1 | 5/2007 | Srivastava et al. |
| 2007/0143128 A1 | 6/2007 | Tokarev et al. |
| 2007/0156636 A1* | 7/2007 | Norton et al. .................... 707/1 |
| 2007/0203887 A1 | 8/2007 | Dynin |
| 2007/0220554 A1 | 9/2007 | Barton et al. |
| 2007/0244888 A1* | 10/2007 | Chea et al. ....................... 707/6 |
| 2007/0282811 A1* | 12/2007 | Musgrove ......................... 707/3 |
| 2007/0288468 A1 | 12/2007 | Sundaresan et al. |
| 2008/0071602 A1* | 3/2008 | Ojakaar et al. ................. 705/10 |
| 2008/0140537 A1* | 6/2008 | Powell ............................ 705/26 |
| 2008/0168023 A1 | 7/2008 | Stephens |
| 2008/0235204 A1* | 9/2008 | Dai et al. .......................... 707/5 |
| 2009/0132905 A1* | 5/2009 | Hoshino ........... G06F 17/30743 715/230 |

* cited by examiner

*1100*

File  Edit  View  Favorites  Tools  Help

Back ▼ | ▼ | X | | | Search | Favorites | Media | | ▼ | ▼ | ▼

Search Suggestions made by BLUE1212

*Page 1 of 1*

Ultimate Alabama 20 #1 Hits
Shows on searches for "Songs of the South"

Why is this item relevant?
" *This album includes Song of the South with the chorus 'Song, song of the South. Sweet potato pie and I shut my mouth. Gone, gone with the wind. There ain't nobody looking back again.*"

1102

Secrets of the Riviera; A Photo Essay
Shows on searches for *"Alessandra Beautiful"*

Why is this item relevant?
" *This book includes pictures of Alessandra Beautiful.*"

1104

MYA
Shows on searches for "Mya Harrison"

Why is this item relevant?
" *Known to many as simply Mya, Mya Harrison is an up-and-coming rhythm and blues singer.*"

1106

A Question of Blood: An Inspector Rebus Novel (Inspector Rebus Mysteries (Paperback ))
Shows on searches for "Scotland"

Why is this item relevant?
"*One of Scotland's better known modern authors, Ian Rankin sets his Inspector Rebus novels in the compelling setting of Edinburgh. Enjoy walking the streets of this world class city, seeing it through the eyes of a cunning police detective.*"

ENHANCED SEARCH WITH USER SUGGESTED SEARCH INFORMATION

CROSS-REFERENCES TO RELATED APPLICATIONS

This application is a continuation of U.S. patent application Ser. No. 11/961,892, entitled ENHANCED SEARCH WITH USER SUGGESTED SEARCH INFORMATION, and filed Dec. 20, 2007, which claims the benefit of U.S. Provisional Patent Application No. 60/908,157, entitled ENHANCED SEARCH WITH USER SUGGESTED SEARCH INFORMATION, and filed Mar. 26, 2007, the disclosures of which are hereby expressly incorporated by reference in their entireties.

BACKGROUND

In a typical network-based environment, users can search for available items by submitting search criteria such as keywords. In some situations, the submitted search terms may not be considered relevant to find the item because the submitted search terms are not associated with a set of stored attribute/characteristics corresponding to the item. Accordingly, the user may have to spend a great deal of time in obtaining search results that can lead the user to the item. Indeed, many items which would be relevant to the user's search may never be found because a fixed set of information about an item, such as keywords, attributes, or characteristics of an item, are generally provided by a manufacturer or seller of the item but not by users of the item.

Currently, most search engine indices do not incorporate information about aspects of an item, such as end user's knowledge or experience, in its relevancy calculations. Most search engines may not provide a way to incorporate end-users' knowledge or suggestions into item information that can be utilized to improve the relevance of search results.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 11 is an illustrative screen display depicting a suggestion maintenance page where several users are allowed to maintain a list of search suggestions submitted by a first user in accordance with an aspect of the present invention;

DETAILED DESCRIPTION

Generally described, embodiments of the present invention relate to a method and system for allowing a user to suggest information about content that can be utilized in processing subsequent searches. The suggested information may be different from a fixed set of information about an item, such as keywords, attributes or characteristics of an item, generally provided by a manufacturer or seller of the item. More specifically, a group of users can submit to a service the information that they feel is relevant to the item. The submitted information may include a brief explanation why the submitted information is relevant to the item and a detailed explanation that would be helpful for other users to make a decision about the item. The submitted information may be associated with the item information and stored in data entries in a data store. The submitted information may be utilized as additional attributes of the item for a search. In addition, when a user requests detail information about an item, the submitted information relevant to the item may be retrieved and displayed to the user.

Figure 1:
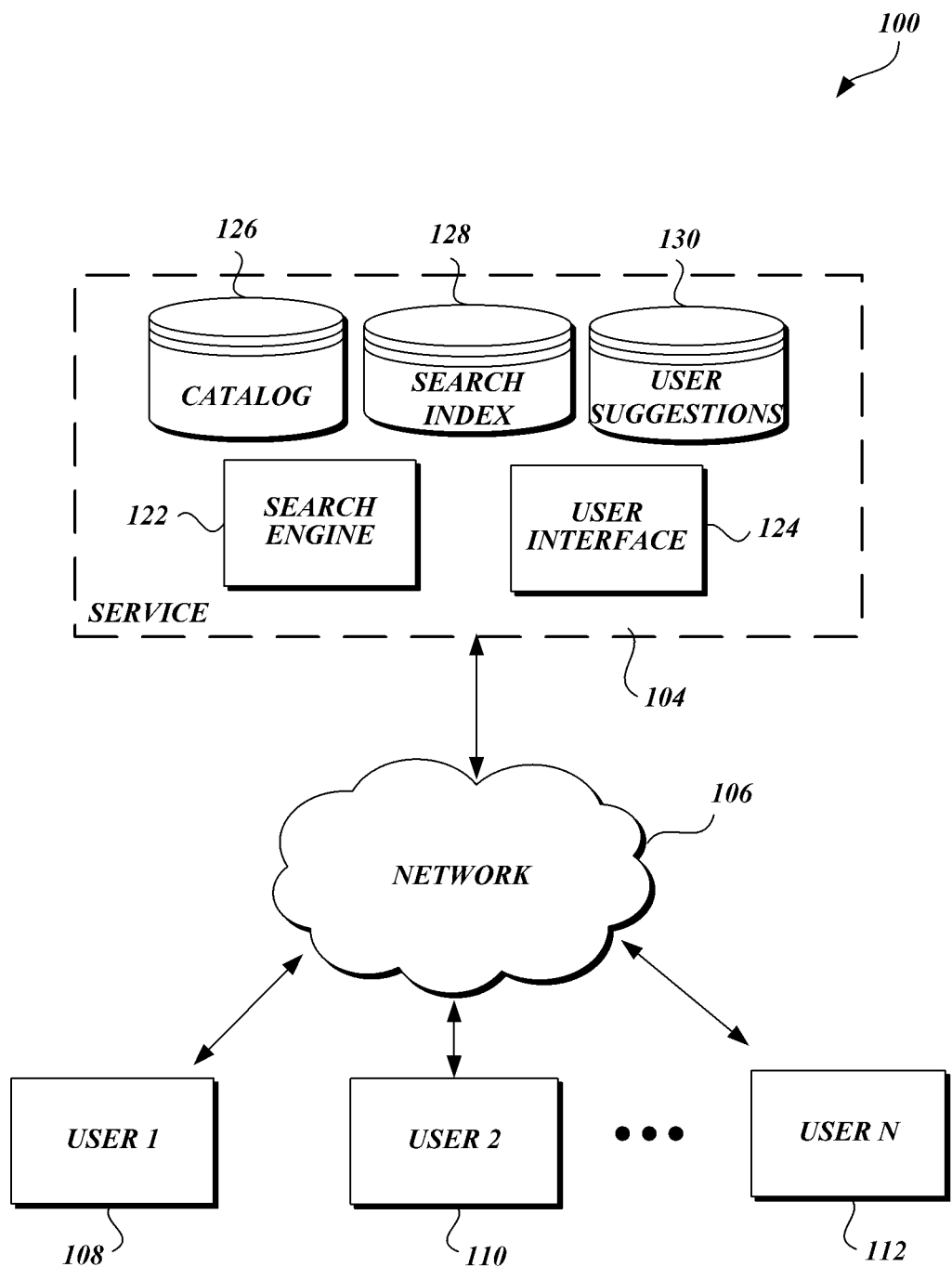
FIG. 1 is a block diagram of an illustrative operating environment including a number of data stores, a service server, and a user device for implementing an enhanced search with user suggested search information in accordance with an aspect of the present invention.

With reference now to FIG. 1, an illustrative operating environment 100 can include a service server (service) 104, including a search engine 122 for searching item information from one or more data stores, such as a catalog data store 126, a search index data store 128, a user suggestions data store 130 including data entries, etc. The service 104 can also include a user interface 124 for providing information to a user device 108-112 which is configured to facilitate user interaction. Within the service 104, the search engine 122 in conjunction with the one or more data stores 126-130 can provide search results including data entries from such data stores to a user interface 124 in response to a search query request which is in turn provided to the user device 108-112 for display to a user. For example, if a user wishes to find items corresponding to Digital Video Discs (DVDs), the user may input a few search keywords describing aspects of the subject matter of interest to the user.

Figure 10:
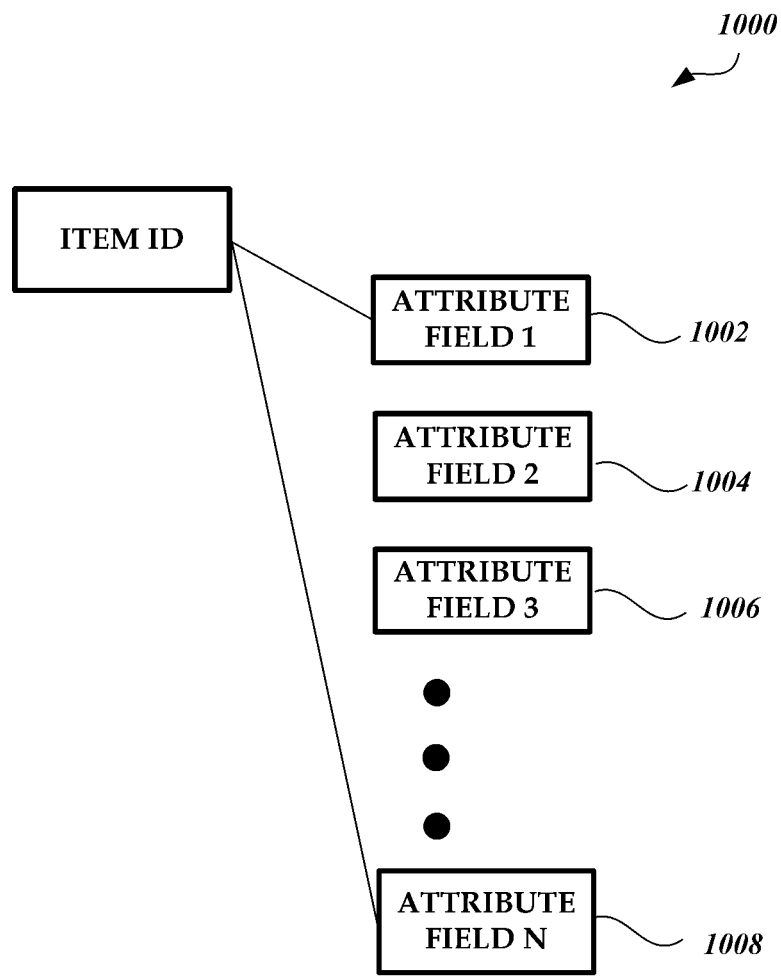
FIG. 10 is a block diagram of a structured set of several attribute fields stored in a search index data store in accordance with an aspect of the present invention.

In an illustrative embodiment, information, related to available movie DVDs, is stored as data entries in a catalog data store. As will be appreciated by one of ordinary skill in the art, each item stored as a data entry in the catalog data store may correspond to a structured set of attribute fields and corresponding values in the search index data store 128. With reference now to FIG. 10, a block diagram 1000 depicts an item corresponding to a set of structured attribute fields 1002-1008 in accordance with an aspect of the present invention. The set of structured attribute fields will be used to store information particular to a corresponding item. For example, if an item is related to the DVD "Sound of Music," several attribute fields are defined to have attribute values related to the item (as specified by an item identifier: unique serial number, Universal Product Code (UPC), Stock Keeping Unit (SKU) number, manufacturer part number, etc.), such as product name, category, style, size, price, manufacturer, seller, main actor, rating, promotion, etc.

In one embodiment, a search suggestion attribute field (hereinafter "suggestion field") may be defined to store keywords or hints identified from user submitted search suggestions related to a particular item. As will be described in greater detail, a search suggestion may be divided into two or more parts. One is a relevance explanation, i.e., a short description about why the search suggestion is relevant to the item, and the other is a detailed explanation, i.e., user's narrative providing detailed information about the item relevant to customers who searched for the suggested keywords. A user who submits a search suggestion (hereinafter "submitter user") may be encouraged or required to input a relevance explanation that deems to be relevant to the particular item. As will be appreciated by one of ordinary skill in the art, the information in the search index data store 126 can be stored and organized in any suitable way that allows items to be searched based on particular attributes. A user device 108-112 may be any type of user devices having functionality and components to facilitate user interactions for an item search and for a suggestion submission in accordance with embodiments of the present invention.

In an illustrative embodiment, a search engine 122 can obtain search results including data entries from one or more data stores such as the search index data store 128 based on a search query transmitted from the user device. A user interface 124 can obtain the search results from the search engine 122 and present a display of the search results to the user device. In an illustrative embodiment, the user interface 124 may provide a front end of a stand-alone application, such as a Web browser displayed on the user device. Alternatively, the user interface 124 can be integrated with one or more software applications within a user device.

One skilled in the relevant art will appreciate that the data and/or components may be stored on a computer-readable medium and loaded into the memory of the user device 108-112 using a drive mechanism associated with the computer-readable medium, such as a floppy, hard disk, CD-ROM, DVD-ROM drive, or network interface. Further, the components can be included on a single device or distributed in any manner. For example, all the components such as the search engine 122 and user interface 124 could be located on the user device 108-112. Furthermore, the components can be integrated in any manner. For example, the search index data store 128 and the user suggestions data store 130 could be integrated into a single data store. Furthermore, the components shown in FIG. 1 represent an illustrative embodiment. In other embodiments, components can be removed or their functionality can be provided by another component.

Figure 2:
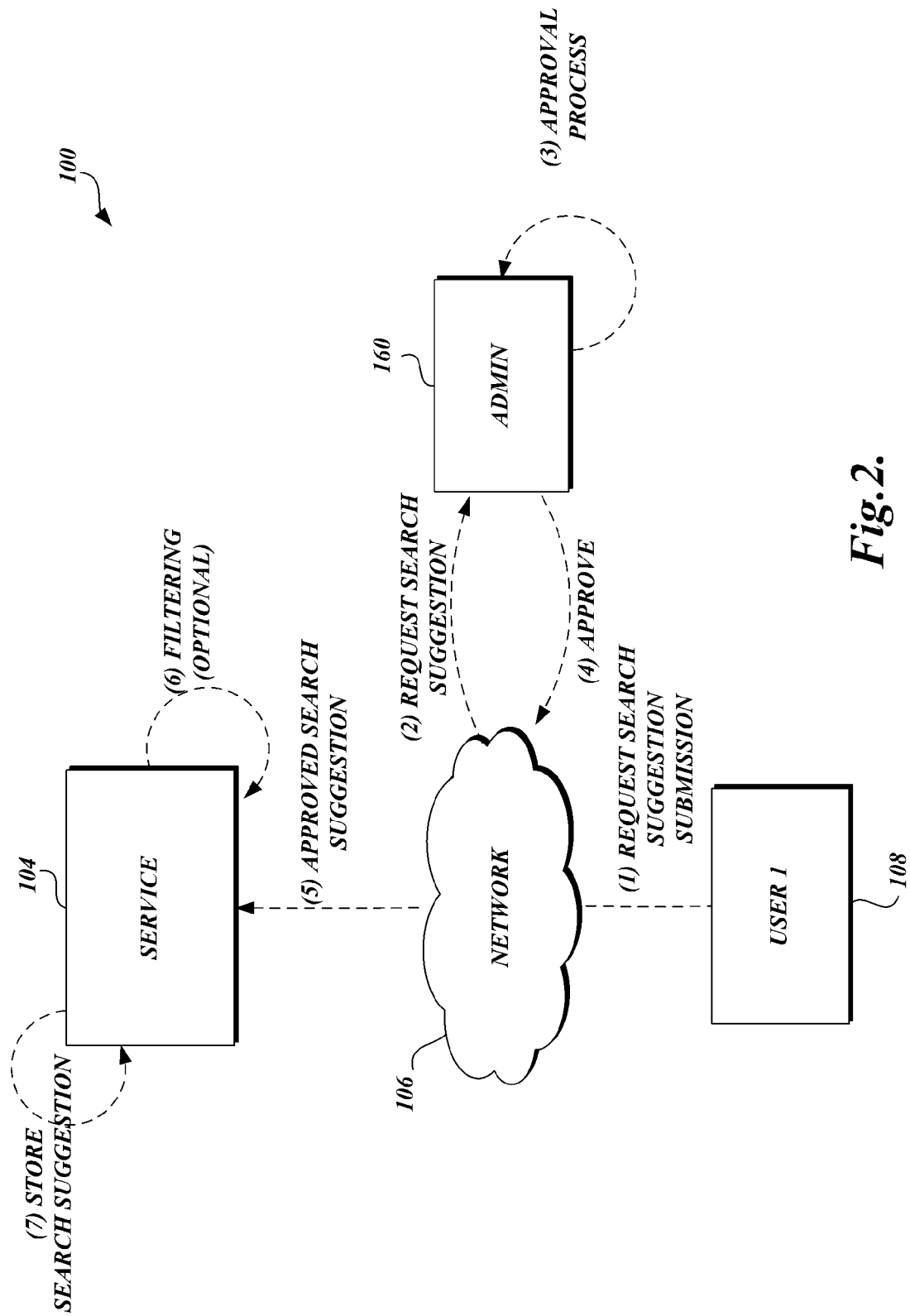
FIG. 2 is a block diagram illustrating interactions of various components in the operating environment where a user submits a search suggestion to the service, which evaluates and stores the search suggestion submission in accordance with an aspect of the present invention.

With reference now to FIG. 2, the interaction by various components of the operating environment 100 where a user device transmits a search suggestion to the service that in return evaluates and stores the search suggestion submission will be described. A submitter user (not shown) may interact with the user device 108 ("user 1") to submit a search suggestion about a particular item that is currently displayed on the user device 108. As will be described in detail below, the search suggestion can be based on the user's personal experience with the particular item, the user's knowledge about attributes of the item, etc. For example, a search suggestion submission can be started by clicking a hyperlink representing a form to submit a search suggestion within a web page displaying an item. For another example, a search suggestion submission can be started by choosing a suggestion submission menu choice provided within a web page. Alternatively, any user may be solicited through email or a pop-up window for submitting search suggestions for items that the user has previously purchased or showed an interest in. In an alternative embodiment, a service may maintain an online community, such as a message board about items, where various members can exchange information about search suggestions.

Figure 9:
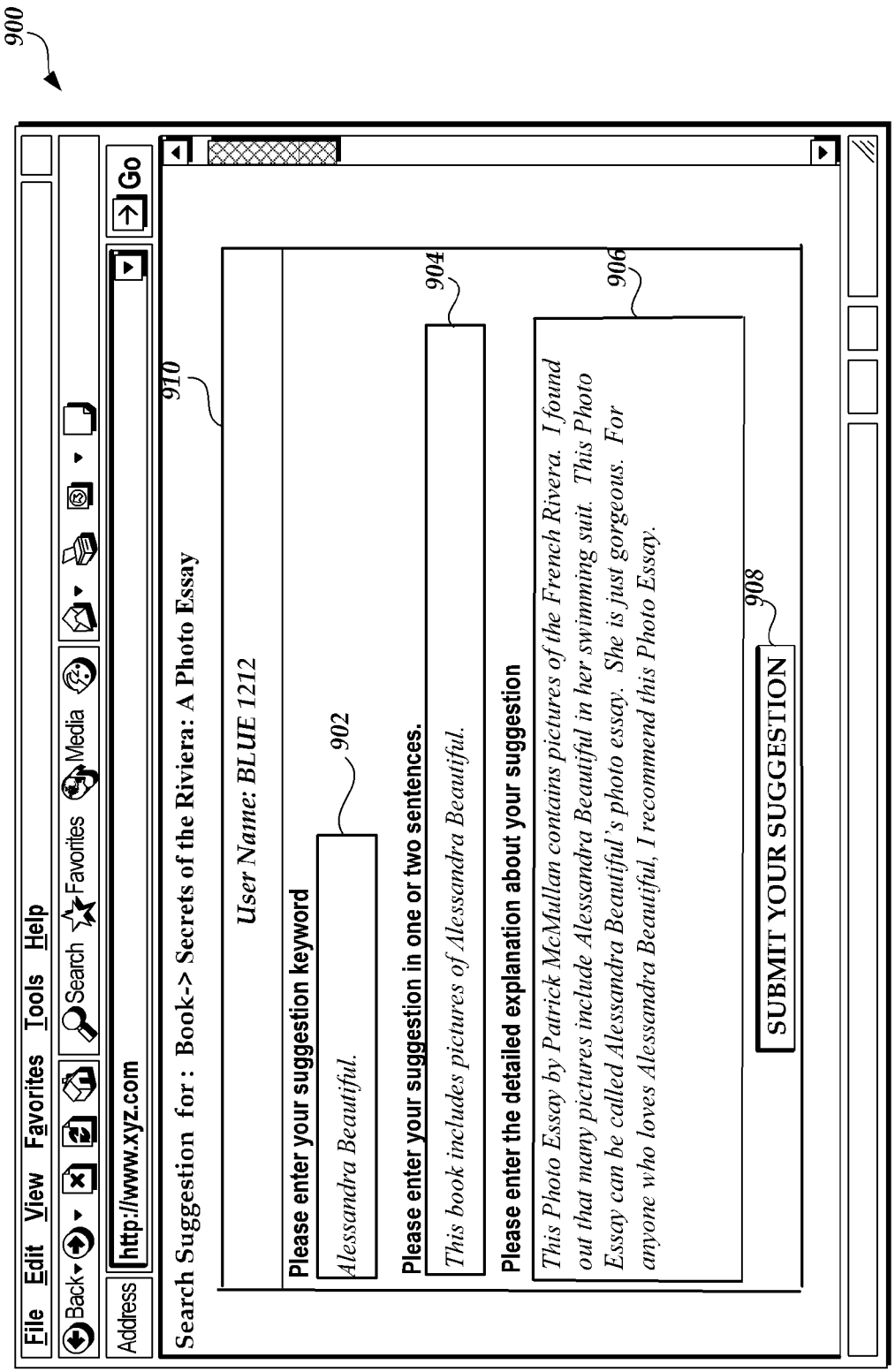
FIG. 9 is an illustrative screen display depicting a search suggestion submitted by a user in accordance with an aspect of the present invention.

Referring now to FIG. 9, an exemplary screen display 900 illustrates a form to submit a search suggestion in accordance with an aspect of the present invention. Assume that a submitter user was reviewing information about a book, for example, "Secrets of the Riviera; a Photo Essay." The submitter user may find that although the photo essay is about French Riviera scenery, many photos include a model whose name is not well known to many people.

The submitter user may think that other people who like the model would want to review the book. As shown, the submitter user may input a keyword (suggestion attribute value) for the search suggestion. For example, the submitter user identified "Alessandra Beautiful" 902 for the keyword. The submitter user may also input a relevance explanation 904 for the book, such as "This book includes pictures of Alessandra Beautiful" and the user's narrative (detailed explanation) 906 such as "This Photo Essay by Patrick McMullan contains pictures of the French Rivera. I found out that many pictures include Alessandra Beautiful in her swimming suit. This Photo Essay can be called Alessandra Beautiful's photo essay. She is just gorgeous. For anyone who loves Alessandra Beautiful, I recommend this Photo Essay." The submitter user may select a button 908 for submission.

Referring back to FIG. 2, after the submitter user inputs a search suggestion and selects a button 908 for submission, the user device 108 may transmit the inputted search suggestion to the service 104. The search suggestion can be transmitted via a communications network 106, such as the Internet.

In one alternative embodiment, the search suggestion may be forwarded to a queue to wait for a manual screening, e.g., an initial screening by human administrators.

While the search suggestion is in the queue for the initial screening, the submitter user can review and edit the search suggestion or cancel the submission of the search suggestion. In one embodiment, human administrators periodically screen the submitted search suggestions under a set of rules in order to weed out offensive content, political content or something that may be against internal policies for the service 104.

As will be appreciated by one of ordinary skill in the art, in one embodiment, the human administrators' screening process can be automated at the client or server side. In another alternative embodiment, a rule-based agent application with feedback from human administrators may mimic behaviors or reasoning of the human administrator in order to filter some of the search suggestions. In yet another embodiment, the screening process can be integrated with services for performing the screening task. For example, a service may be invoked to bid or outsource each screening task or a set of screening tasks. As mentioned above, the search suggestions can be evaluated by a group of users who are selected by the service, who share a similar interest in the subject of the search suggestions, or who are in a same community. For example, a foreign movie online discussion community may review the submitted search suggestions for foreign movies and provide recommendations as to whether the submitted search suggestion is relevant to a particular item.

A service 104 obtains the search suggestion approved from the initial screening. The service 104 may conduct another filtering/screening process to detect any redundancy between the search suggestion and other stored information related to the item or the previously submitted search suggestions related to the item. For example, if the user has submitted a search suggestion about a DVD but the relevancy explanation of the search suggestion is in fact the title of the DVD, the search suggestion may not be accepted by the service 104. Optionally, the service 104 may conduct more filtering to detect search suggestions which the initial screening failed to filter out for their offensive content, political content or something that may be against internal policies. When the submitted search suggestion is rejected, the service 104 may issue a notification to a user explaining the reason of the rejection.

In an illustrative embodiment, after the service determines to accept the search suggestion, the service 104 may identify a suggestion keyword from the search suggestion. Referring back to FIG. 9, the submitter user may submit a suggestion keyword 902 for a user suggestion. In an alternative embodiment, the service may parse a part of the search suggestion, for example, a relevance explanation (a short description about why the search suggestion is relevant to the item) of the search suggestion into several suggestion keywords.

The suggestion keyword(s) may be used by the search engine to take the search suggestion into account for determining relevancy with a search query. Subsequently, the service 104 stores the search suggestion as a data entry on the user suggestion data store 130 and updates the search index data store 128 with the suggestion keyword(s). As mentioned above, on the search index data store 128, the suggestion keywords may be stored in a suggestion field as an additional attribute (hereinafter "suggestion attributes value") of the item.

Figure 3A:
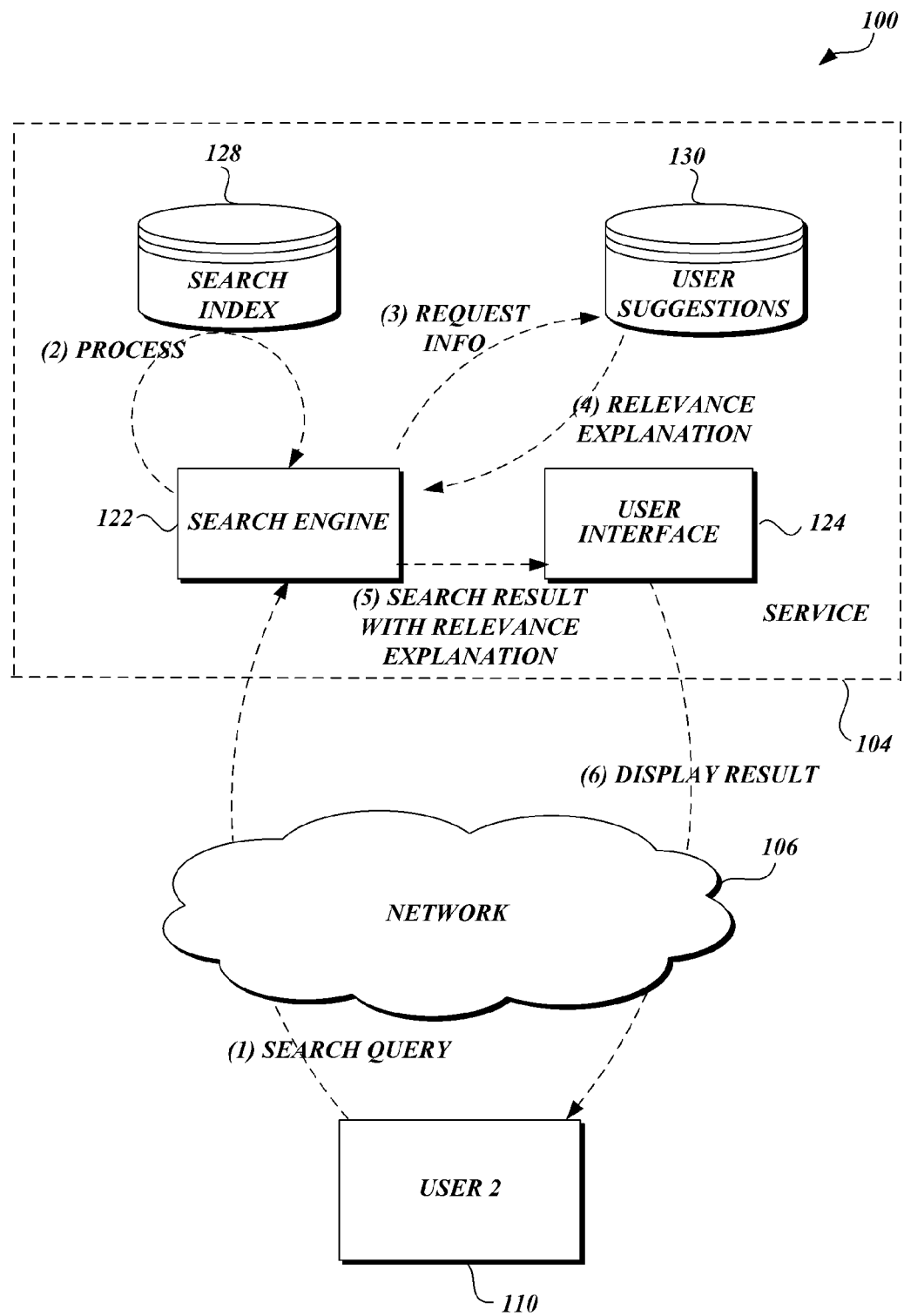
FIGS. 3A and 3B are block diagrams of the operating environment of FIG. 1 illustrating interactions among various components in the operating environment where a user submits a search query to the service that returns search results with search suggestions in accordance with an aspect of the present invention.
Figure 3B:
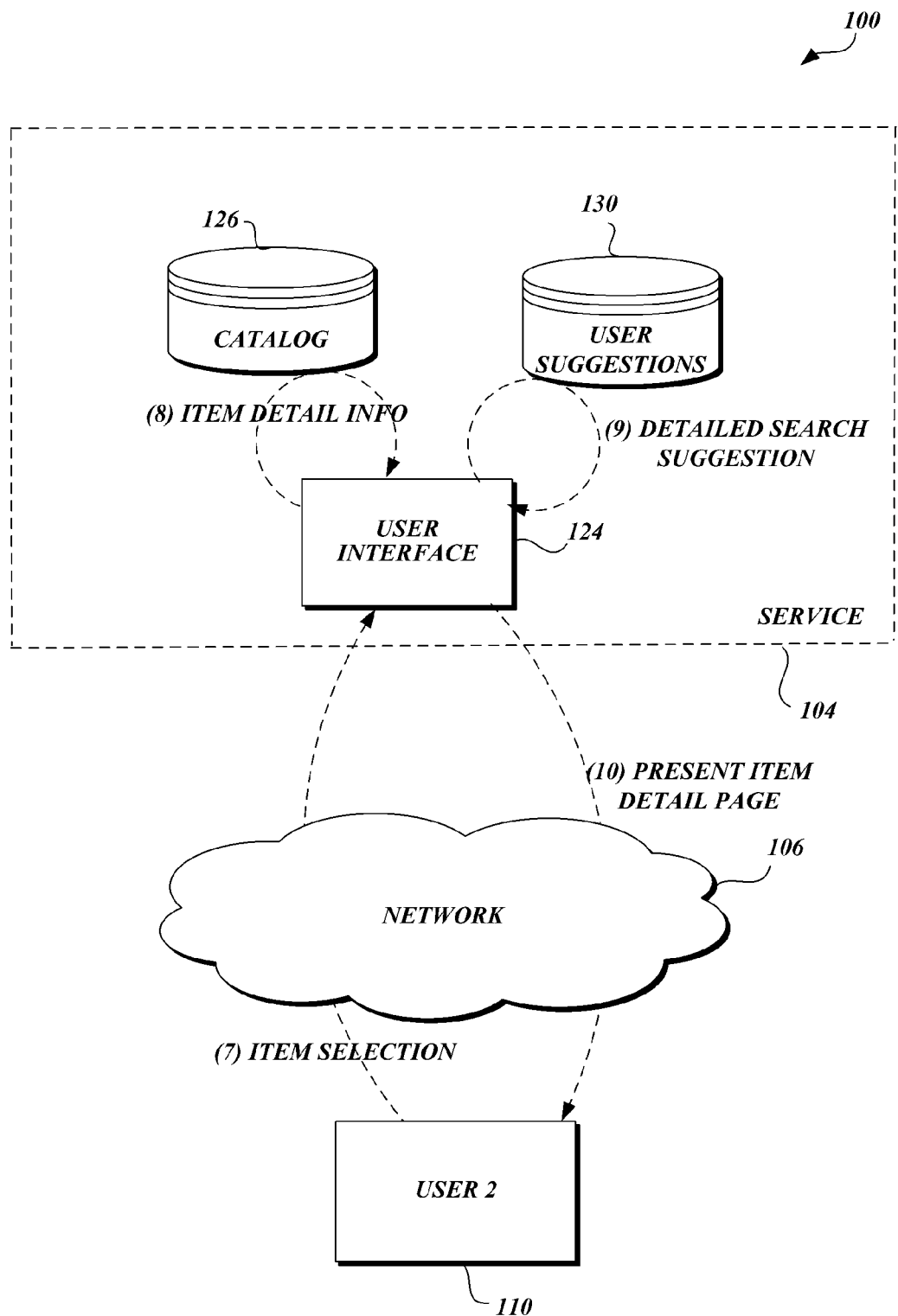

FIGS. 3A and 3B are block diagrams of the operating environment of FIG. 1 illustrating interactions among various components in the operating environment where a user device submits a search query to the service, which returns search results in conjunction with search suggestions of the search results in accordance with an aspect of the present invention.

As illustrated in FIG. 3A, a user (not shown) may make a selection for a search request about an item. For example, a user may input a search query including several keywords describing the item. Subsequently, the user device 110 ("user 2") may issue a request for the initial search. The search request can be transmitted via a communications network 106, such as the Internet. A service 104 obtains the request and then the service 104 (the search engine 122) would process the search query by issuing a query request to the search index data store 128. As with FIG. 2, assume that additional attribute or a keyword recognized from a search suggestion is stored in the search index data store and the search suggestion is also stored in the user suggestions data store 130. Each search suggestion is associated with an item that a user indicates to be relevant to the search suggestion.

Based on the initial search, one or more entries of the user suggestions data store 130 can be identified. In one embodiment, the search engine 122 issues the search query on the search index data store 128 to determine if one or more items were considered relevant to the search criteria based, in part, on relevancy to the suggestion attribute values. As will be appreciated by one of ordinary skill in the art, one item may be associated with several search suggestions. With the matching suggestion attribute values, the search engine can identify the data entries of the user suggestions data store 130 which corresponds to the matching suggestion attribute values. The search engine 122 may request from the user suggestions data store 130 the relevance explanations of the identified entries. Subsequently, the search engine 122 may receive the requested relevance explanations. The search engine may provide the user interface 124 with the search results with corresponding relevance explanations.

Once the user interface 124 receives the search results and corresponding relevance explanation from the search engine 122, the user interface 124 may construct a display page including the search results and the corresponding relevance explanation for a user device 110. The user interface 124 may transmit the display page information to the user device 110. The display page information can be transmitted via a communications network 106. Subsequently, a user may be presented with the display page including the search results and corresponding relevance explanation on the user device 110. As will be discussed in greater detail below, the relevance explanation may be presented to users as part of the general description of items. A user can make a selection from the displayed search results to view detailed information about a particular item.

Figure 5:
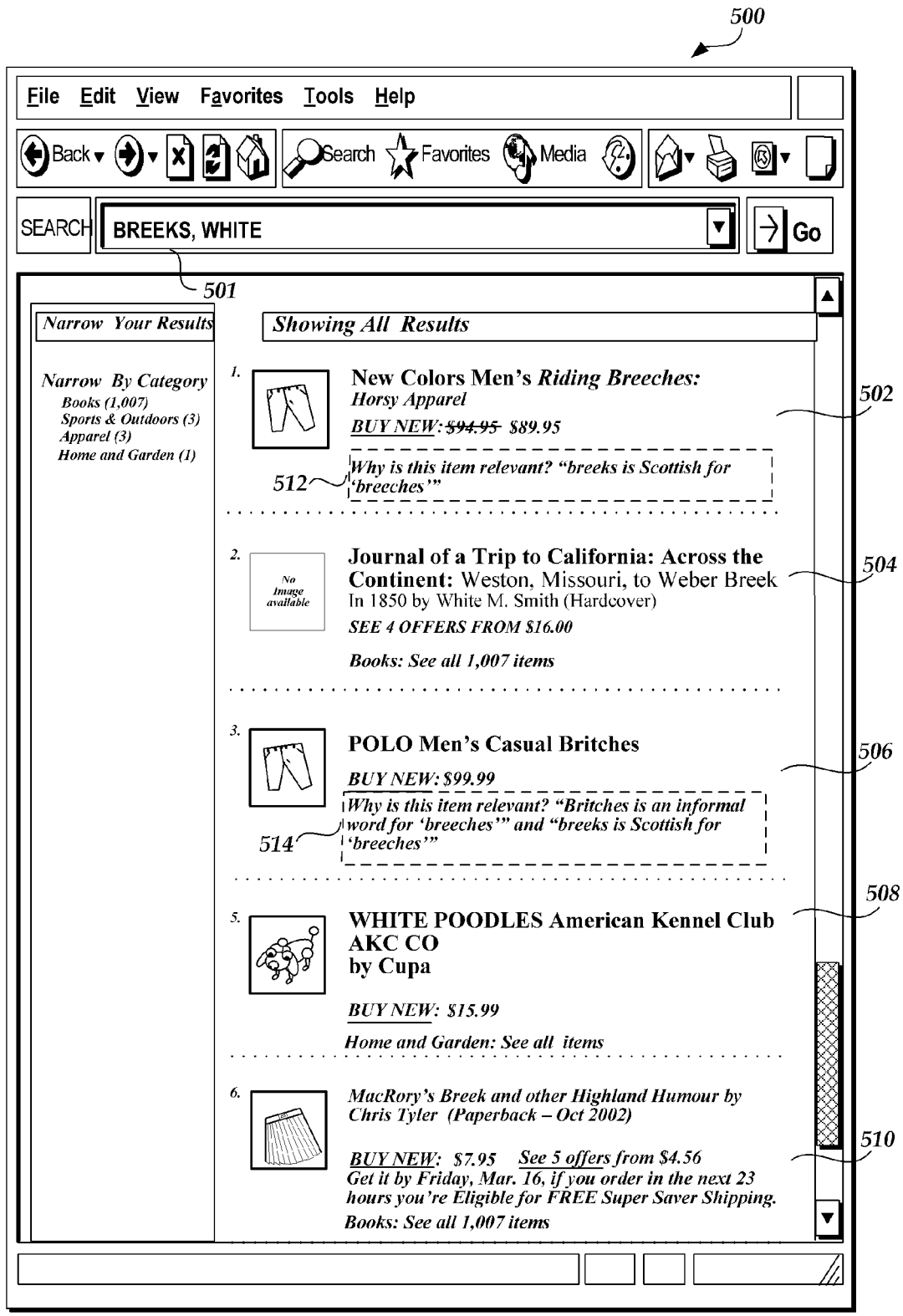
FIG. 5 is an illustrative screen display depicting the search results and corresponding relevancy explanations in accordance with an aspect of the present invention.

Referring now to FIG. 5, an exemplary display screen 500 reflecting the results of a search performed with the service 104 for a particular item based on the search query 501, "BREEKS, WHITE" is depicted. The screen display 500 includes five matching items, result item 502-510, found as a result of searching. As shown, two result items 502, 506 have relevance explanations 512, 514, respectively. The result item 506 is a "Men's Riding Breeches" item. In this example, another user (submitter user) has submitted a search suggestion including relevance explanation such as "breeks is Scottish for breeches" to help other users to search the "Men's Riding Breeches" item with a keyword "breeks." After the submitter user submitted the seat. The suggestion for the "Men's Riding Breeches" item, the service 104 has stored a suggestion keyword "breeks" in a suggestion field of the index entry of the "Men's Riding Breeches" item. Thus, in one illustrative embodiment, when there is a search query including "breeks," the search results based on search query may include items having attribute values matching "breeks," for example, "Men's Riding Breeches" item. In another illustrative embodiment, the relevance explanation is provided in response to a query when the query exactly matches the search suggestion. The service 104 has stored the submitted search suggestion, "breeks is Scottish for breeches," in the user suggestions data store 130. The stored search suggestion is associated with the "Men's Riding Breeches" item and may be displayed for detailed information of the associated item.

In one embodiment, each search suggestion in the user suggestions data store 130 can be searched or queried by an item identifier of the associated item. In one embodiment, the keyword identified from the search suggestion may be stored in one of the attribute fields of an index entry. In that embodiment, the service 104 may not be able to differentiate the keywords initially provided by a manufacture or seller from the keywords identified from the search suggestions submitted by users.

Referring now to FIG. 3B, a user selects an item to view detail information about a particular item from the display on the user device 110. Continuing with the example above, in FIG. 5, a user can select result item 506 "Men's Casual Britches" to view the detailed information about the relevance explanation. The user may want to know whether "britches" means something else that the user should know before the purchase.

Referring back to FIG. 3B, once the user selects the item, the selection may be transmitted from the user device 110 to the user interface 124 of the service 104. The user interface 124 obtains item detail information from the catalog data store 126 and a detailed explanation about the search suggestion from the user suggestions data store 130. With obtained information, the user interface 124 generates a detail page for the selected item. Continuing with the example above in FIG. 5, the user selects result item 506 corresponding to the "Men's Casual Britches" item after the user noticed that "britches" also refers "breeks" from the relevance explanation 514. Subsequently, the user interface 124 may obtain item detail information of the "Men's Casual Britches" item from the catalog data store and the detailed explanation about the search suggestion. The user interface 124 may generate and present the detailed page to the user.

Figure 4:
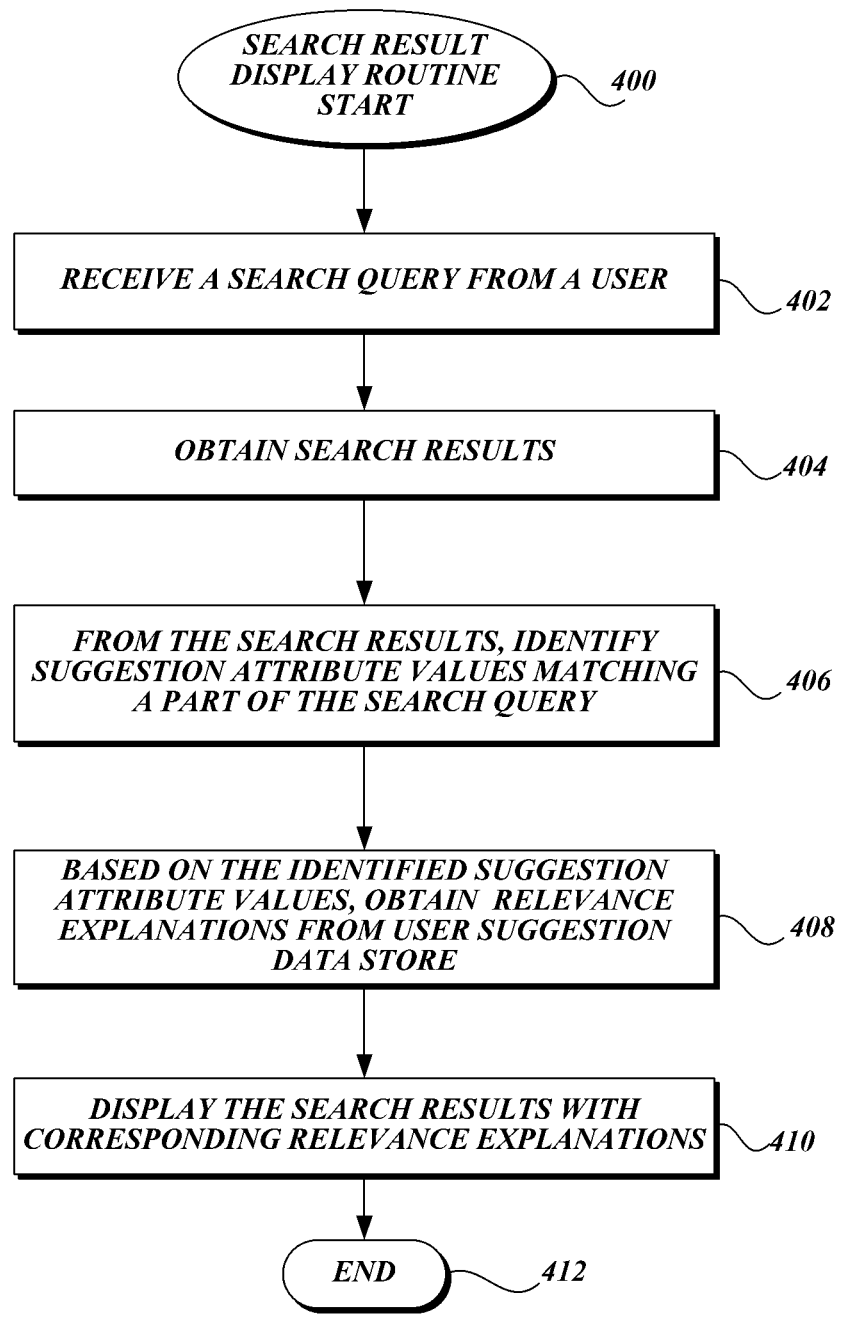
FIG. 4 is a flow diagram of an illustrative routine for conducting a search on data stores which includes search suggestions submitted by users in accordance with an aspect of the present invention.

With reference to FIG. 4, a flow diagram depicts an illustrative search result display routine 400 for conducting a search on data stores, which includes search suggestions submitted by users in accordance with an aspect of the present invention. For the purpose of discussion, assume that a group of selected users have successfully submitted search suggestion information about an item. The information specified in the submitted search suggestions may be different from the attributes (or detailed information) of the item, which are stored in the search index 128 and catalog data stores 126. Assume further that each submitted search suggestion is associated with the corresponding item so that other users can view the search suggestion along with the item information. As mentioned above, the user suggestions data store 130 stores a relevance explanation and detail explanation for each search suggestion. Further, there can be more than one search suggestion associated with one item. Some suggestions may be updated, removed or evaluated by a submitter user, an authorized user or the service 104.

Beginning with block 402, a request for search may be received from a user. As explained above, a user can input a search query or select a search query by clicking a hyperlink on a Web page. For example, referring to FIG. 5, a user can input "breeks" in a search query box 501 in the web page 500. At block 404, the service 104 may conduct a search on the data stores and obtain search results. Subsequently, the service 104 identifies one or more search suggestions which include a keyword or a hint relevant to the search query. For example, the user device can transmit a request for search with the search query inputted by the user to a service 104. The service 104 conducts a search with the search query on the search index data store and obtains search results. The service 104 may go through suggestion attribute values of each index entry in the search results to identify the suggestion attribute value matching at least part of the search query. Alternatively, the service 104 may identify suggestion attribute values of each index entry that has some relevance to the search query. As mentioned above, at the time of submission, a search suggestion is associated with a particular item through a suggestion keyword. Typically, the suggestion keyword is provided by a submitter user or recognized (identified) from the relevance explanation of the search suggestion. In an alternative embodiment, the suggestion keyword can be identified from the detailed explanation by a natural language process. One or more keywords can be identified or obtained for one user suggestion. The suggestion keywords (suggestion attribute values) may be stored in a suggestion field associated with the particular item.

At block 406, the service 104 may identify suggestion attribute values that have been utilized for obtaining the search results. As mentioned above, the service 104 may identify the suggestion attribute values matching at least part of the search query. At block 408, the service 104 obtains from the user suggestion data store 130 a relevant explanation of a search suggestion corresponding to the identified search suggestion attribute value. At block 410, the search results are displayed with the identified search suggestion attribute and the relevant explanation. A user can select one from the displayed search results to view more detailed information.

Referring now to FIG. 5, the service may obtain item information by conducting a search with the search query on the catalog data store in conjunction with the search index data store. The service also identifies relevance explanations which have been suggested by some users as relevant to "breeks." As shown, the service 104 can recognize that relevance explanations for result items 502, 506 include keywords or hints relevant to the search query "breeks."

For example, result item 502 is men's riding breeches item that includes a relevance explanation, such as "Breeks is Scottish for 'breeches.'" In this example, some user previously recognized that item 502 could be relevant to "breeks" because the term "breeks" is Scottish for "breeches" and items manufactured in the United States may be labeled "breeches" instead of "breeks." A user may submit a suggestion keyword for item 502, such as "breeks," a relevance explanation for the suggestion keyword, such as "Breeks is Scottish for 'breeches,'" and a detailed explanation. After the submission, a suggestion keyword "breeks" may be stored in a search suggestion field of the "Men's riding breeches" item. Likewise, result item 506 is a "Men's Casual Britches" item that is associated with a relevance explanation such as "Britches is an informal word for 'breeches' and breeks is Scottish for 'breeches.'" In this example, the "Men's Casual Britches" item may have two suggestion keywords such as "breeks" and "breeches" stored in the search index data store 128. When presenting the web page as depicted in FIG. 5, the service displays the relevance explanation 512, 514 in order to help users to understand why the search results 502, 506 are relevant to the search query.

Figure 6:
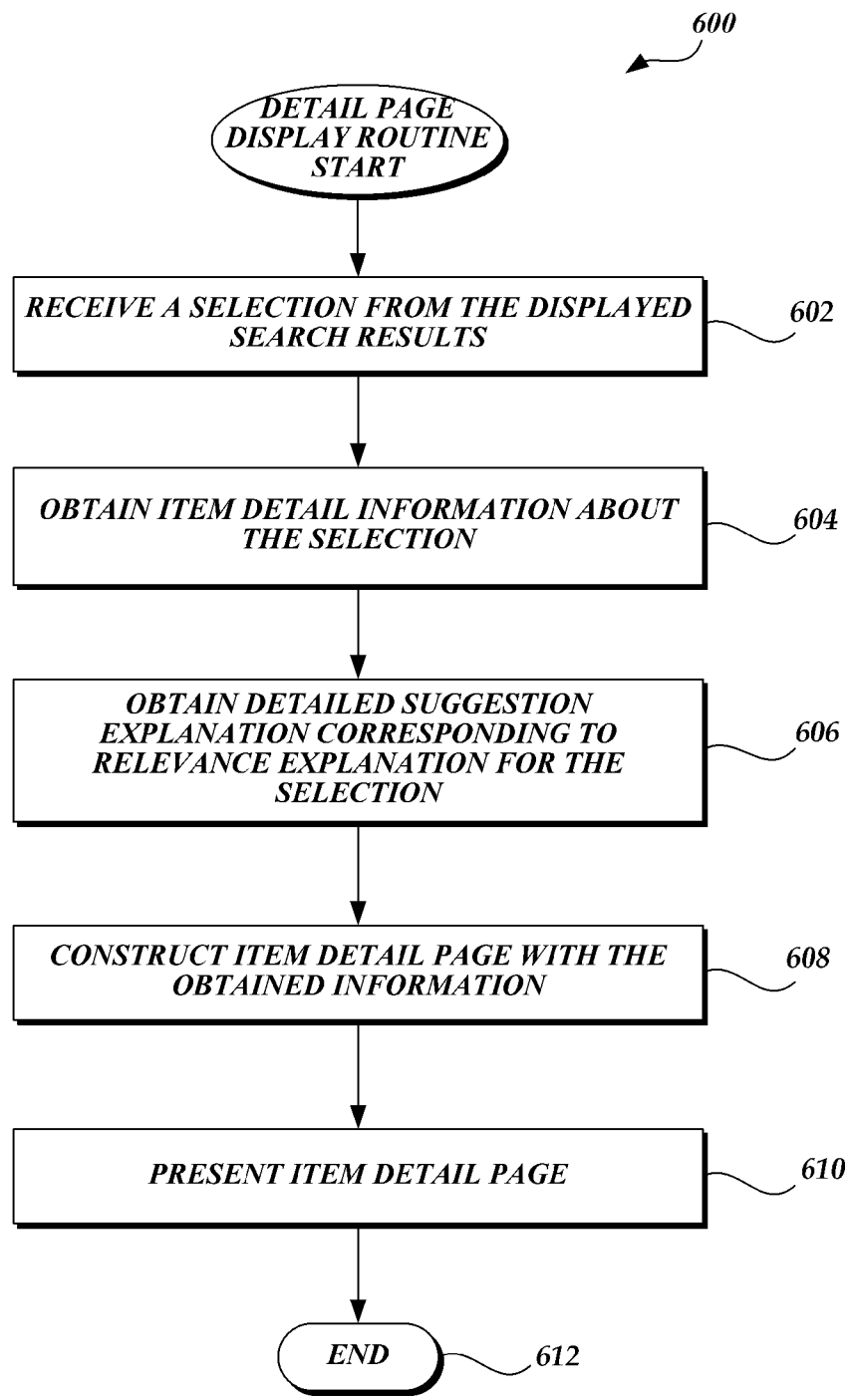
FIG. 6 is a flow diagram of an illustrative routine for presenting a detail page for an item in response to a user selection where the detail page includes search suggestion information in accordance with an aspect of the present invention.

With reference to FIG. 6, a flow diagram depicts an illustrative detail page display routine 600 for presenting a detail page of an item in response to a user selection for the item where the detail page also includes detailed explanation of a search suggestion is shown in accordance with an aspect of the present invention.

At block 602, a service 104 receives a selection (selected item) from the displayed search results. At block 604, a service obtains item detail information related to the selected item from the catalog data store 124. At block 606 a service obtains detailed explanation of the search suggestion associated with the selected item. As mentioned above, the detailed explanation is a user narrative explaining why the suggestion is relevant to the item or why the item should be returned for search results if the suggestion is a part of the search query. At block 608, a server constructs an item detail page with the obtained information. At block 610, the constructed item detail page may be presented to a user. The routine 600 completes at block 612.

Figure 7A:
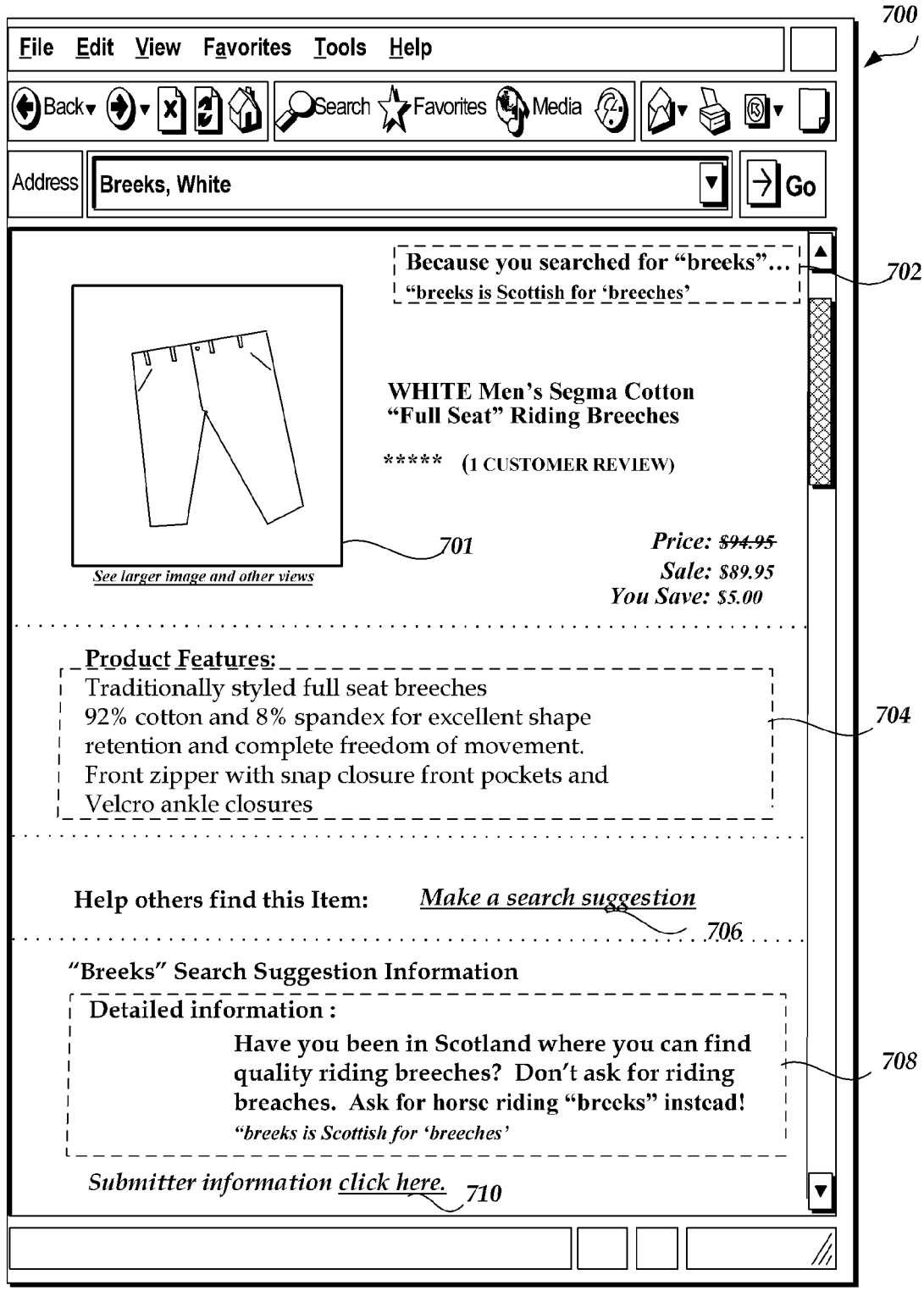
FIG. 7A is an illustrative screen display depicting the detail page where the item detail information is displayed in conjunction with the detailed search suggestion associated with the item in accordance with an aspect of the present invention.

Referring now to FIG. 7A, an exemplary screen display 700 illustrating the detail page of FIG. 6 where the item detail information is displayed in conjunction with the detailed explanation of a search suggestion associated with the selected item in accordance with an aspect of the present invention. As with FIG. 5, assume that a user is presented with search results such as a list of items and relevance explanations submitted by other users for one or more items in the search result. Assume further that the user selected result item 502 to view a detailed page of the result item 502. A service 104 obtains item detail information 704 about the selected item from the catalog data store 126 and detailed explanation 708 of the search suggestion associated with the selected item from the user suggestions data store 130.

As shown, the service 104 obtains item detail information 704, such as "Traditionally styled full seat breech, 92% cotton and 8% spandex for excellent shape retention and complete freedom of movement. Front zipper with snap closure front pockets and Velcro ankle closures" and detailed explanation 708 of the search suggestion, such as "Have you traveled to Scotland where you can find quality riding breeches? Don't ask for riding breeches. Ask for horse riding "breeks" instead!" Subsequently, the service 104 constructs an item detail page 700 with the relevance explanation 702 and the obtained information 704, 708 as depicted in FIG. 7 A. In addition, a user can submit a new search suggestion for the displayed item through the item detail page 700. As shown in FIG. 7A, if a user selects "Make a Search Suggestion" link 706, a search suggestion submission form as depicted in FIG. 7B may be presented to assist the user to enter a search suggestion about the displayed item 701, such as "Men's Riding Breeches."

Figure 7B:
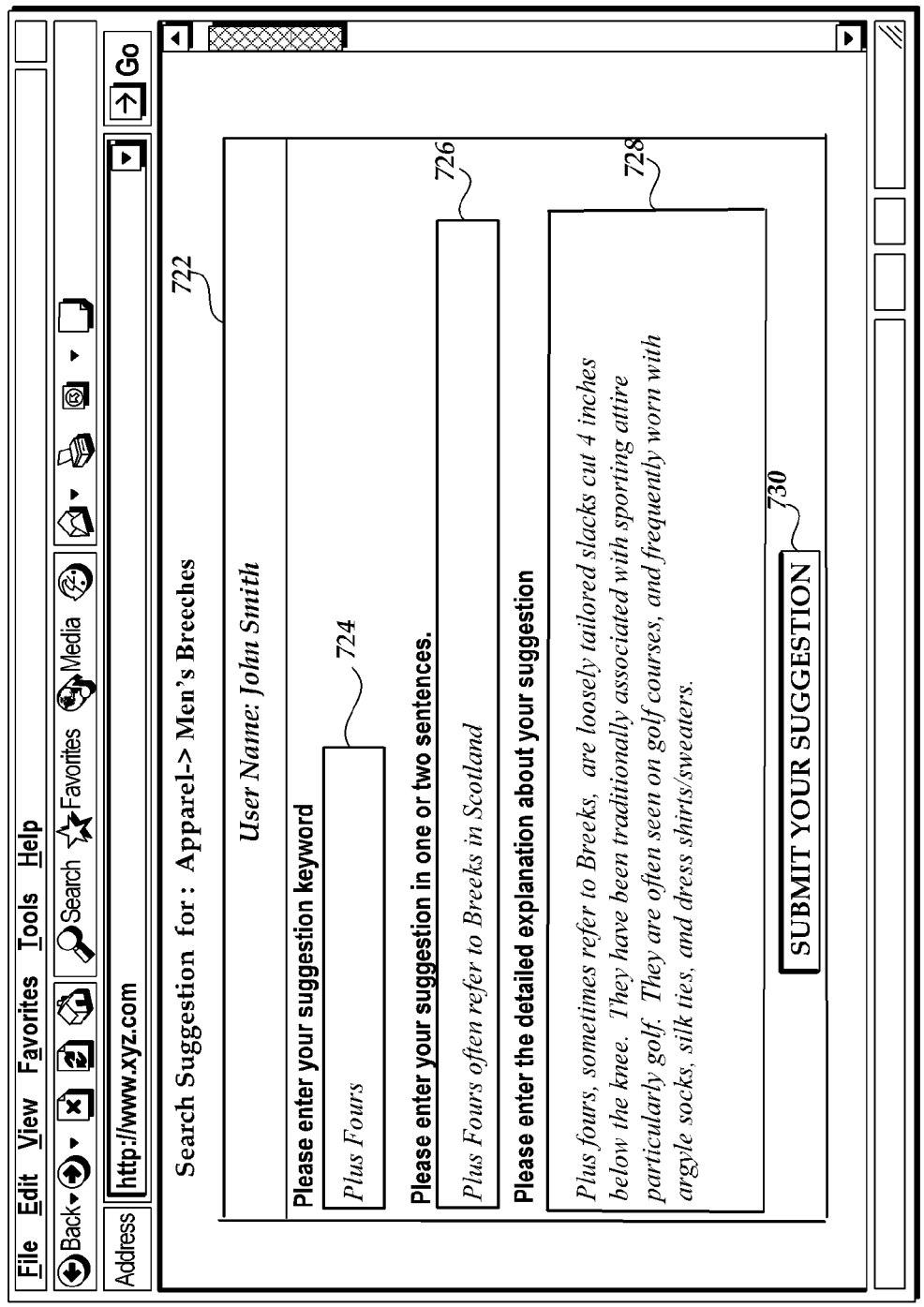
FIG. 7B is an illustrative screen display depicting a search suggestion submitted for the item displayed in the detail page.

Referring to FIG. 7B, an illustrative screen display 720 depicts a search suggestion form where a submitter user can submit a search suggestion for an item in accordance with an aspect of the present invention. As shown, the submitter user may identify a user suggestion which the submitter user thinks is helpful to other users. For example, the submitter user identifies "Plus Fours" which is relevant to "Breeches." The submitter user may input "Plus Fours" in the keyword box 724. The submitter user may also input a relevance explanation 726 of the keyword, such as "Plus Four often refers to 'breeks' that is Scottish for 'breeches.'" and the user's narrative (detailed explanation) 728 such as "Plus fours, sometimes refer to breeks in Scotland, are loosely tailored slacks cut 4 inches below the knee. They have been traditionally associated with sporting attire particularly golf. They are often seen on golf courses, and frequently worn with argyle socks, silk ties and dress shirts/sweaters." The submitter user may select a button 730 for submission of the user suggestion. The keyword "Plus Fours" is stored as another suggestion attribute value in a suggestion field of the displayed item, "Men's Riding Breeches." The relevance explanation and the detailed explanation may be associated with the suggestion attribute value "Plus Fours" and stored in a suggestion data store 130. As described above, the submitted user suggestion may be manually or automatically filtered before the server stores the submitted user suggestion in the data stores 128,130.

In some instances, the service may display more than one search suggestion associated with an item. In that case, a server may order or prioritize the search suggestions based on the confidence score of each search suggestion. The confidence score can be determined by various factors, including, but not limited to user voting, the number of hits on the detailed explanation, etc. For example, the service 104 may allow users to vote for the best search suggestion among the several search suggestions associated with a particular item. If a search suggestion gets high votes, the confidence score of the search suggestion may be increased. For another example, the service 104 may allow users to rate a search suggestion based on the usefulness of the search suggestion. If a search suggestion gets high votes, the confidence score of the search suggestion may be increased. Also, the service 104 may evaluate the volume of sales made through each search suggestion. If the volume of sales is high, the confidence score of the suggestion may be also increased. The service may display the search suggestions in order of the confidence score.

In one embodiment, the service 104 may periodically re-evaluate the confidence scores of the stored search suggestions in order to maintain a manageable number of search suggestions per item. The service may discard search suggestions with a poor confidence score. Further, the search suggestions may be utilized to determine relevancy scores in the search result.

Scoring may not be limited to the suggestions provided by users. In one illustrative embodiment, the submitter user providing the suggestions may also be rated using techniques similar to those used for rating suggestions. For example, other submitter users may be allowed to vote on various suggestions provided by a particular submitter user. If the particular submitter user consistently gets high ratings for his suggestions, the submitter user is assigned a high score. The submitter user's score may be calculated by averaging the scores of all the suggestions he has provided. Other techniques may also be used to assign a score to a submitter user, such as tracking the number of suggestions provided by the particular submitter user that are associated with search hits and sales.

Figure 8:
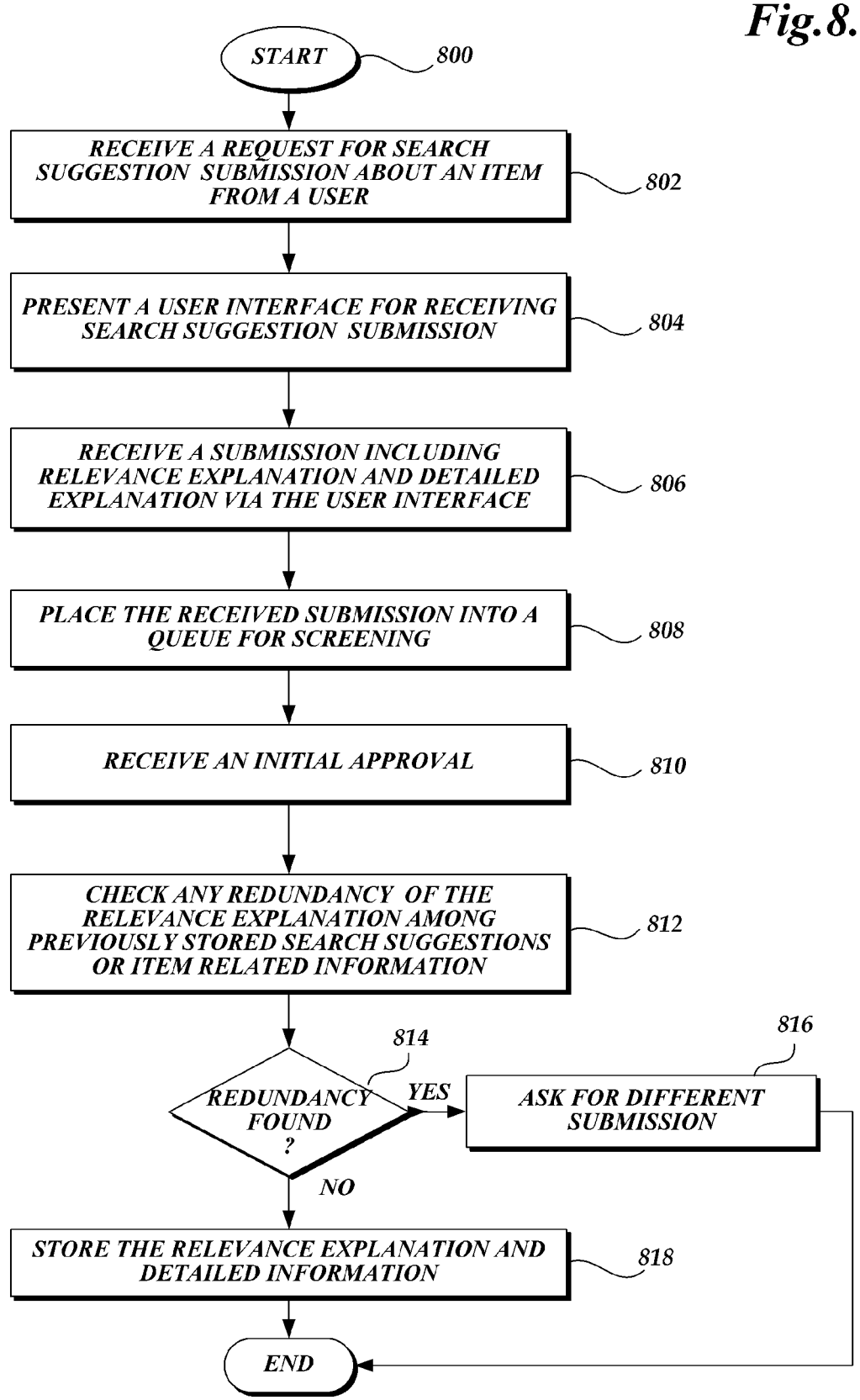
FIG. 8 is a flow diagram of an illustrative routine for conducting a search on data stores which includes attribute information extracted from search suggestions submitted by users.

FIG. 8 is a flow diagram for storing a search suggestion and attribute information extracted from a submitted search suggestion in accordance with an aspect of the present invention.

At block 802, a service 104 receives a request for submitting a search suggestion about a particular item. In one embodiment, the request for submitting a search suggestion may be initiated by clicking a hyperlink which points to a user interface that enables a user to submit a search suggestion. At block 804, the service 104 presents a user interface, such as a search suggestion form, with which the user can input a search suggestion for the particular item. At block 806 the service 104 receives from a user a search suggestion including a keyword, a short description (relevance explanation), and narrative (detailed explanation). At block 808, the received search suggestion is placed into a queue for evaluation. The human administrator may filter some search suggestions which are offensive to the general public, which are politically motivated, which include curse words, which are against internal policies of the service, etc. In an alternative embodiment, this filtering process can be automated by a filtering application. At block 810, a service 104 may receive an approval on the submitted search suggestion from the human administrator or the automated filtering application. At block 812, a service 104 may determine whether the submitted search suggestion can be accepted and therefore is suitable for being incorporated into a part of the data stores. The service 104 may further screen the submitted search suggestion if the search suggestion is redundant to another search suggestion stored, preciously stored attributes of the item, etc. At decision block 814, it is determined as to whether the submitted search suggestion can be redundant information which is previously stored for the item. If it is determined at decision block 814 that no redundancy is found, the search suggestion may be stored in the user suggestions data store 130. Also, suggestion keywords may be identified from the search suggestion and associated with the current item. For example, the identified suggestion keywords are stored in a suggestion field of an index entry for the particular item. If it is determined at decision block 814 that redundancy is found, the service 104 recommends a submission of a new search suggestion.

In one embodiment, the service 104 may maintain user reputation information, including, but not limited to, a "trust level," "ranking," etc., for users. The "trust level" of a user may be determined based on previous actions that human administrators (or the service) have applied to the user. For example, if the search suggestion submitted by a user is disapproved by a human administrator, the trust level of the user may be downgraded. The age of an account may be considered as a factor to determine the trust level of a user. The "ranking" of a user may be determined based on other users' reactions to a search suggestion submitted by the user. Other information, such as the number of submitted suggestions versus rejected suggestions, a period of inactivity of the account, total number of search suggestions determined to be redundant, etc., may be included in the user reputation information.

In some instances, the reputation information (e.g., trust level, ranking, etc.) of a user may be used when a search suggestion submitted by the user is screened or filtered. For example, if the reputation information indicates that the user can be trusted, the service may issue a qualification certificate to the user so that the search suggestions submitted by a user with the qualification certificate may bypass a manual screening or filtering.

With reference to FIG. 11, an illustrative screen display 1100 depicts a search suggestion page where several search suggestions submitted by one user are listed and managed in accordance with an aspect of the present invention. In one embodiment, the service may maintain user profile information which includes a list of the search suggestions submitted by a user. As shown, a user with user identifier "BLUE1212" has submitted several search suggestions for items. In one embodiment, a list of the search suggestions submitted by one user can be viewed by other users. A user may be allowed to submit to the service a request to influence search suggestions submitted by other users. For example, a user can submit a feedback on the search suggestions submitted by other users, rank the search suggestions, report to the service that a particular search suggestion can offend some people, etc.

Further, a user may be able to maintain his/her search suggestions by requesting the service to remove, or update a search suggestion. For example, the user with user identifier "BLUE1212" can request to remove a search suggestion 1102-1108 from the user suggestions data store 130. Upon receipt of the request, the service may determine whether the search suggestion can be removed or change. In one embodiment, the list of search suggestions made by a group of users (e.g., suggestion community) can be managed by the group. In some instance, linkage may be established with other community features such as review board, personalized blogs, etc. In this manner, more users can participate in the process of search suggestions, which may improve user retention and leverage the user community to exercise self-regulation/policing.

Figure 12:
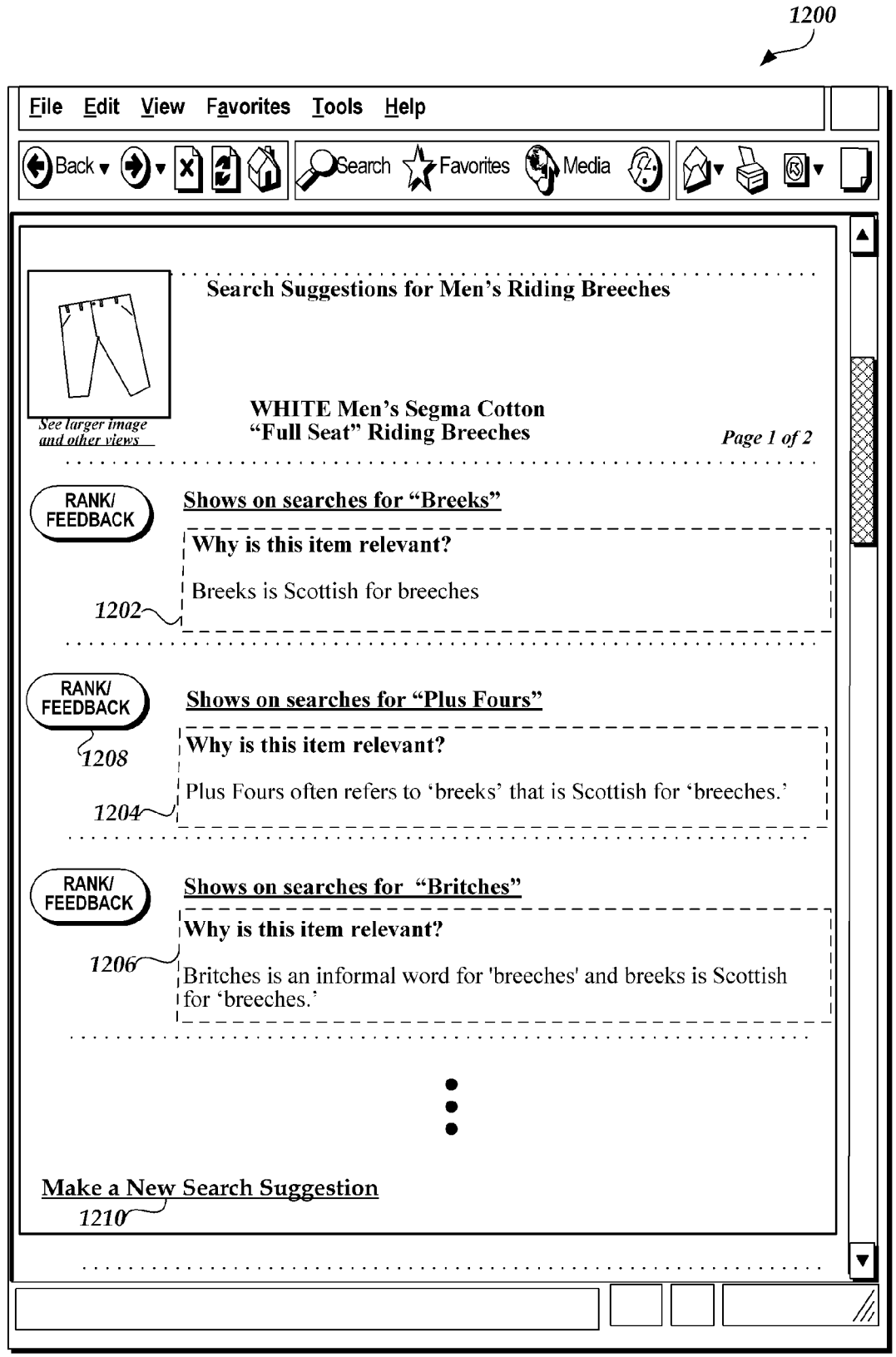
FIG. 12 is an illustrative screen display depicting a suggestion maintenance page where several users are allowed to maintain a list of search suggestions associated with an item in accordance with an aspect of the present invention.

The ranking of search suggestions is not limited to the ranking of search suggestions submitted by a particular user, such as BLUE1212. Ranking of search suggestions may be performed based on suggestions displayed with a particular item. FIG. 12 is an illustrative Web page showing a number of search suggestions related to a particular item, in this example, "Breeches." Search suggestions 1202, 1204 and 1206 may have been submitted by the same submitter user or by different submitter users. In one illustrative embodiment, each of the search suggestions 1202, 1204, and 1206 is associated with a corresponding rank/feedback button 1208. Selecting the rank/feedback button 1208 causes another page, such as a dialog box or a pop-up window, to appear for ranking the corresponding search suggestion. The item-based suggestion review page 1200 may be used by submitter users or by end-users of the search service 104. In one illustrative embodiment, the item-based suggestion review page 1200 is accessible only to submitter users recognized by the service 104, for example, by having been registered as submitter users previously. In another illustrative embodiment, the item-based suggestion review page 1200 is accessible to all users of the service 104. The users of service 104 can rank the suggestions to influence and improve the quality of search suggestions that appear with search results. The user may select a link 1210 or other GUI control, such as a button, to make a new search suggestion, or add comments to an existing suggestion, associated with the particular item currently displayed in the item-based suggestion review page 1200. Those skilled in the art will appreciate that access control policies, such as read/write/modify/delete permissions, may be used to control access to existing or new search suggestions.

Figure 13:
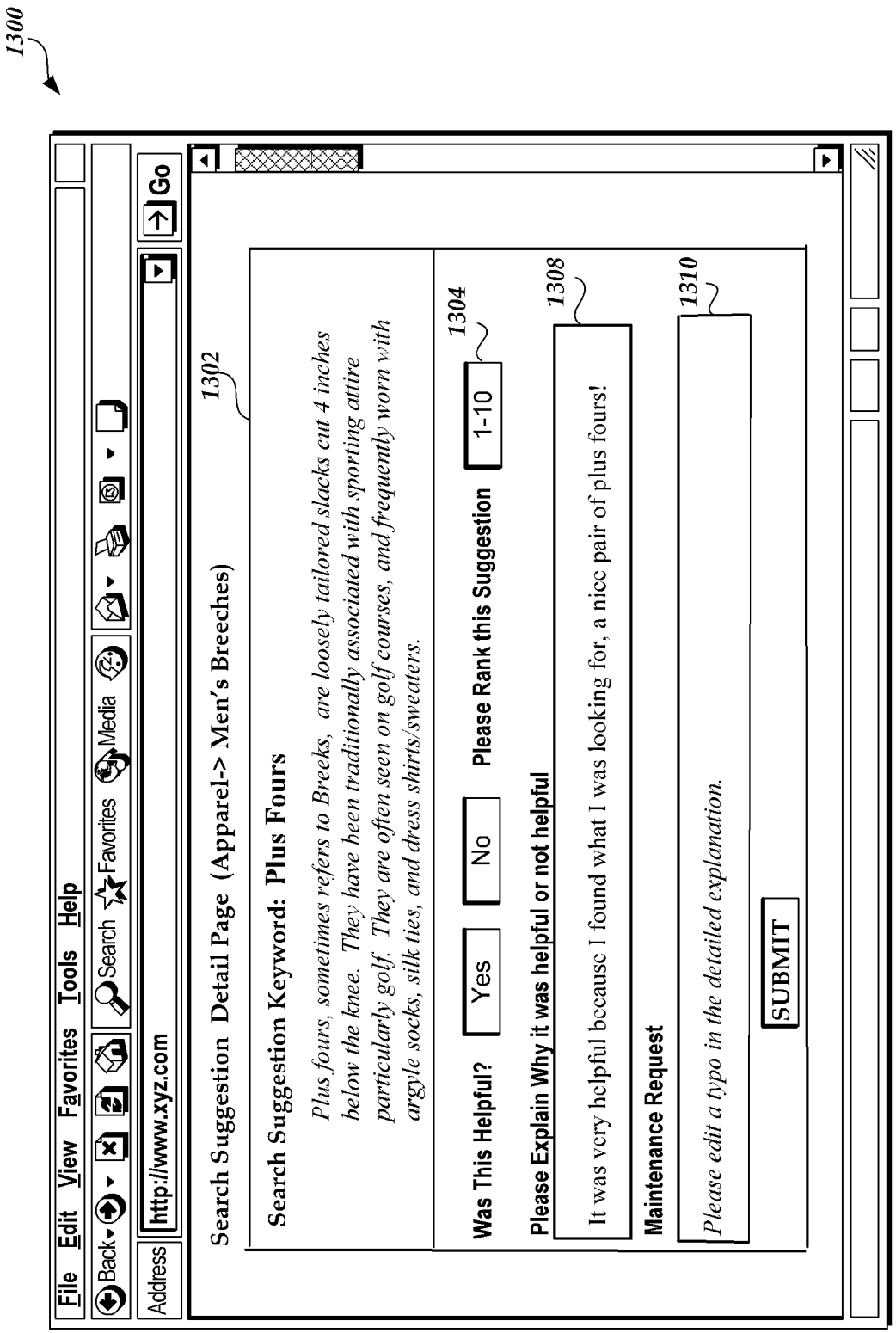
FIG. 13 is an illustrative screen display depicting a detail page for ranking a search suggestion submitted by one user in accordance with an aspect of the present invention.

Once the user chooses to rank a suggestion by selecting the rank/feedback button 1208, a new page is presented for data entry by the user. FIG. 13 is an illustrative ranking page 1300 used for ranking search suggestions. The suggestion ranking page 1300 may include a listing of the search suggestion 1302 being ranked, a ranking scale 1304, a comment field 1308 and other administrative data entry fields, such as a maintenance request text field 1310. Those skilled in the art will appreciate that the suggestion ranking page 1300 may be configured in many other ways without departing from the spirit of the present disclosures. For example, the ranking scale 1308 may include multiple components such as "clarity" scale, "relevance" scale, "completeness" scale, etc. Such multiple components may be used separately or combined according to a predetermined scheme to generate a single composite ranking for the given search suggestion 1302. The rank of a suggestion may be used by the service 104 to improve the quality of search suggestions displayed with related search results.

One skilled in the art will recognize that the aforementioned embodiments are described for illustrative purpose only, and thus, are not to be construed as limiting. Moreover, although specific screen displays and exemplary flow diagrams are illustrated in conjunction with specific data store components, it should be understood that the examples provided are not exhaustive and do not limit the present application. It should also be understood that search suggestions submitted by users can be utilized in various other applications which are either related or unrelated to searches.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

While illustrative embodiments have been illustrated and described, it will be appreciated that various changes can be made therein without departing from the spirit and scope of the invention.

What is claimed is:

1. A computer-implemented method for locating an item with user suggestion information, the computer-implemented method comprising:
   receiving, from a first user device, at least one search suggestion for an item,
      wherein the at least one search suggestion includes a utility explanation defined by a user associated with the first user device, and
      wherein the utility explanation includes an explanation for using at least one suggestion keyword in subsequent search queries for locating the item based at least partly on a determined familiarity with the item;
   determining whether the at least one search suggestion is similar to one or more item attributes currently associated with the item;
   in response to determining that the at least one search suggestion is not similar to the one or more item attributes currently associated with the item, associating the at least one search suggestion with the item as at least one suggestion attribute for the item;
   receiving, from a second user device, a subsequent search query for locating the item, wherein the subsequent search query comprises a search attribute;
   in response to the subsequent search query, identifying the item by matching the search attribute against the one or more item attributes and the at least one suggestion attribute for the item; and
   generating a search result page for display, the search result page including a list of one or more data entries related to the item.

2. The method of claim 1 further comprising causing a display, in response to a user request received via the search result page, of a detailed information page, including relevance information obtained from a user that relates to the search suggestion for the item.

3. The method of claim 2, wherein the relevance information corresponding to the search suggestion is used to explain the relevance of the obtained data entries to the item.

4. The method of claim 1 further comprising soliciting one or more new search suggestions for the item from a user.

5. The method of claim 4 further comprising:
   comparing the one or more new search suggestions with one or more item attributes and suggestion attributes previously associated with the item; and
   determining whether the one or more new user search suggestions are different from the previously associated attributes for the item.

6. The method of claim 5 further comprising associating the one or more new search suggestions with the item, as one or more new suggestion attributes for the item, in response to determining that the one or more new search suggestions are different from the previously associated attributes for the item.

7. The method of claim 4 further comprising causing evaluation of the one or more new search suggestions by a third party.

8. The method of claim 1, wherein receiving the subsequent search query comprises receiving the subsequent search query using a networked service for collecting search suggestions from users.

9. A system comprising:
   a data store configured to at least store computer-executable instructions; and
   a hardware processor in communication with the data store, the hardware processor configured to execute the computer-executable instructions to at least:
      receive, from a first user device, at least one search suggestion for an item,
         wherein the at least one search suggestion includes a utility explanation defined by a user associated with the first user device, and
         wherein the utility explanation includes an explanation for using at least one suggestion keyword in subsequent search queries for locating the item based at least partly on a determined familiarity with the item;
      determine that the at least one search suggestion is not similar to one or more item attributes currently associated with the item;
      in response to determining that the at least one search suggestion is not similar to the one or more item attributes currently associated with the item, associate the at least one search suggestion with the item as at least one suggestion attribute for the item;
      receive a subsequent search query from a second user device for locating the item;
      in response to the subsequent search query from the second user device for locating the item, obtain a list of one or more data entries related to the item by matching the search query against the one or more item attributes and the at least one suggestion attribute for the item;
generate information corresponding to search results, the search results including the list of one or more obtained data entries; and
cause display of a search result page, wherein the search result page includes the list of the one or more obtained data entries.

10. The system of claim 9, wherein the search result page further includes relevance information corresponding to one or more obtained data entries.

11. The system of claim 10, wherein the relevance information is obtained by searching a data store that stores the at least one search suggestion, based at least in part on suggestion attributes associated with the one or more data entries.

12. The system of claim 11, wherein the suggestion attributes associated with the one or more data entries are related to the subsequent search query.

13. The system of claim 10, wherein the relevance information is derived from a utility explanation of a corresponding search suggestion.

14. A non-transitory computer-readable storage medium storing computer-executable instructions that when executed by a processor perform operations comprising:
receiving, from a first user, at least one search suggestion for an item,
wherein the at least one search suggestion includes a utility explanation defined by the first user, and
wherein the utility explanation includes an explanation for using at least one suggestion keyword in subsequent search queries for locating the item based at least partly on a determined familiarity with the item;
determining whether the at least one search suggestion is similar to one or more item attributes currently associated with the item;
in response to determining that the at least one search suggestion is not similar to the one or more item attributes currently associated with the item, associating the at least one search suggestion with the item as at least one suggestion attribute for the item;
receiving a subsequent search query from a second user for locating the item;
in response to the subsequent search query from the second user for locating the item, identifying the item by matching the search query against the one or more item attributes and the at least one suggestion attribute for the item; and
causing display of a search result page, wherein the search result page include a list of one or more data entries related to the item.

15. The non-transitory computer-readable storage medium of claim 14, wherein associating the at least one search suggestion with the item comprises:
identifying the at least one suggestion keyword based at least in part on the utility explanation;
storing the at least one suggestion keyword as a suggestion attribute in association with the item; and
storing the utility explanation in a search suggestion data store.

16. The non-transitory computer-readable storage medium of claim 15, wherein the at least one suggestion keyword is provided by the user.

17. The computer-implemented method of claim 15, wherein the operations further comprise associating a trust level with the first user based on at least one of the at least one suggestion keyword or the utility explanation.

18. The non-transitory computer-readable storage medium of claim 14, wherein identifying the item comprises:
identifying the list of one or more data entries each having a suggestion attribute that relates to the search query; and
obtaining a corresponding utility explanation corresponding to the respective suggestion attribute.

19. The non-transitory computer-readable storage medium of claim 14, wherein the operations further comprise:
filtering the search suggestion to detect prohibited content; and
receiving an approval based on the filtering.

20. The non-transitory computer-readable storage medium of claim 14, wherein the operations further comprise determining a confidence score for the utility explanation as it relates to the at least one suggestion attribute.

* * * * *

UNITED STATES PATENT AND TRADEMARK OFFICE
CERTIFICATE OF CORRECTION

PATENT NO. : 9,465,888 B1  
APPLICATION NO. : 14/150595  
DATED : October 11, 2016  
INVENTOR(S) : Graeme N. Smith Page 1 of 1

It is certified that error appears in the above-identified patent and that said Letters Patent is hereby corrected as shown below:

In the Specification

In Column 9 at Line 48, Change "7 A." to --7A.--.

Signed and Sealed this  
Fourth Day of April, 2017

Michelle K. Lee  
*Director of the United States Patent and Trademark Office*